J. H. GIBSON.
APPARATUS FOR INDICATING THE MAGNITUDE OF THE TORQUE IN SHAFTING.
APPLICATION FILED FEB. 9, 1907.
902,394.
Patented Oct. 27, 1908.
4 SHEETS—SHEET 1.
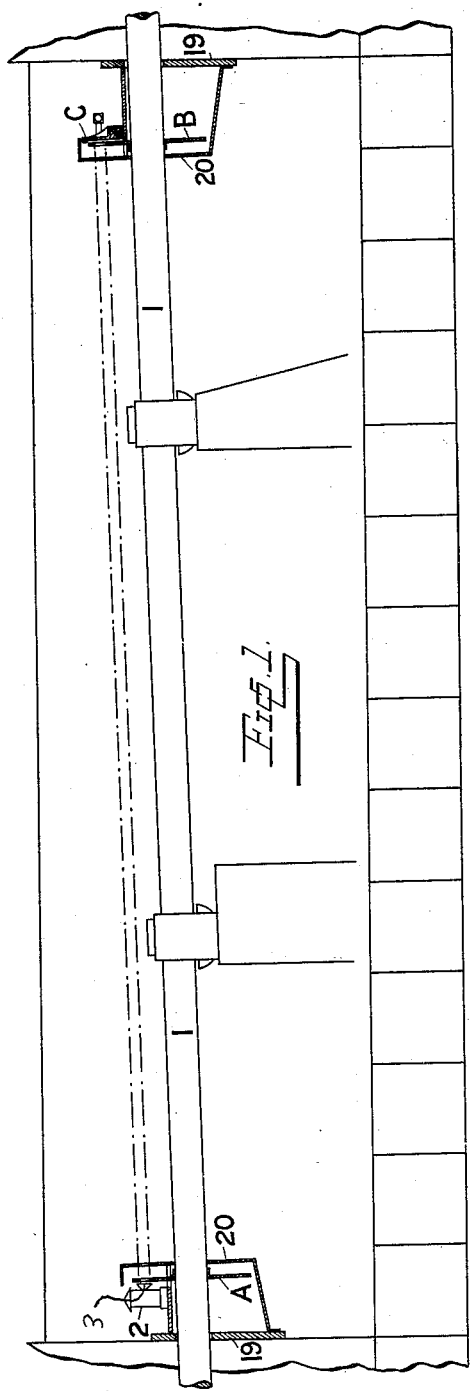
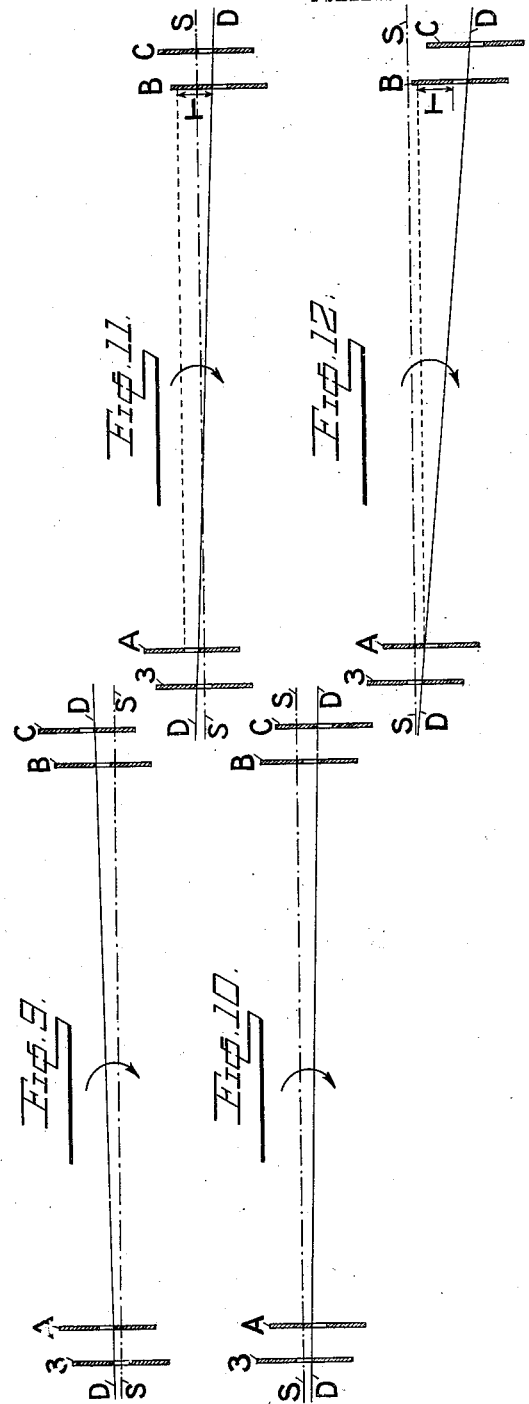
Attest:
C. S. ——
Edward N. Sarton
Inventor.
Joseph H. Gibson
by Spear, Middleton, Donaldson & Spear
Attys J. H. GIBSON.
APPARATUS FOR INDICATING THE MAGNITUDE OF THE TORQUE IN SHAFTING.
APPLICATION FILED FEB. 9, 1907.
902,394.
Patented Oct. 27, 1908.
4 SHEETS—SHEET 2.
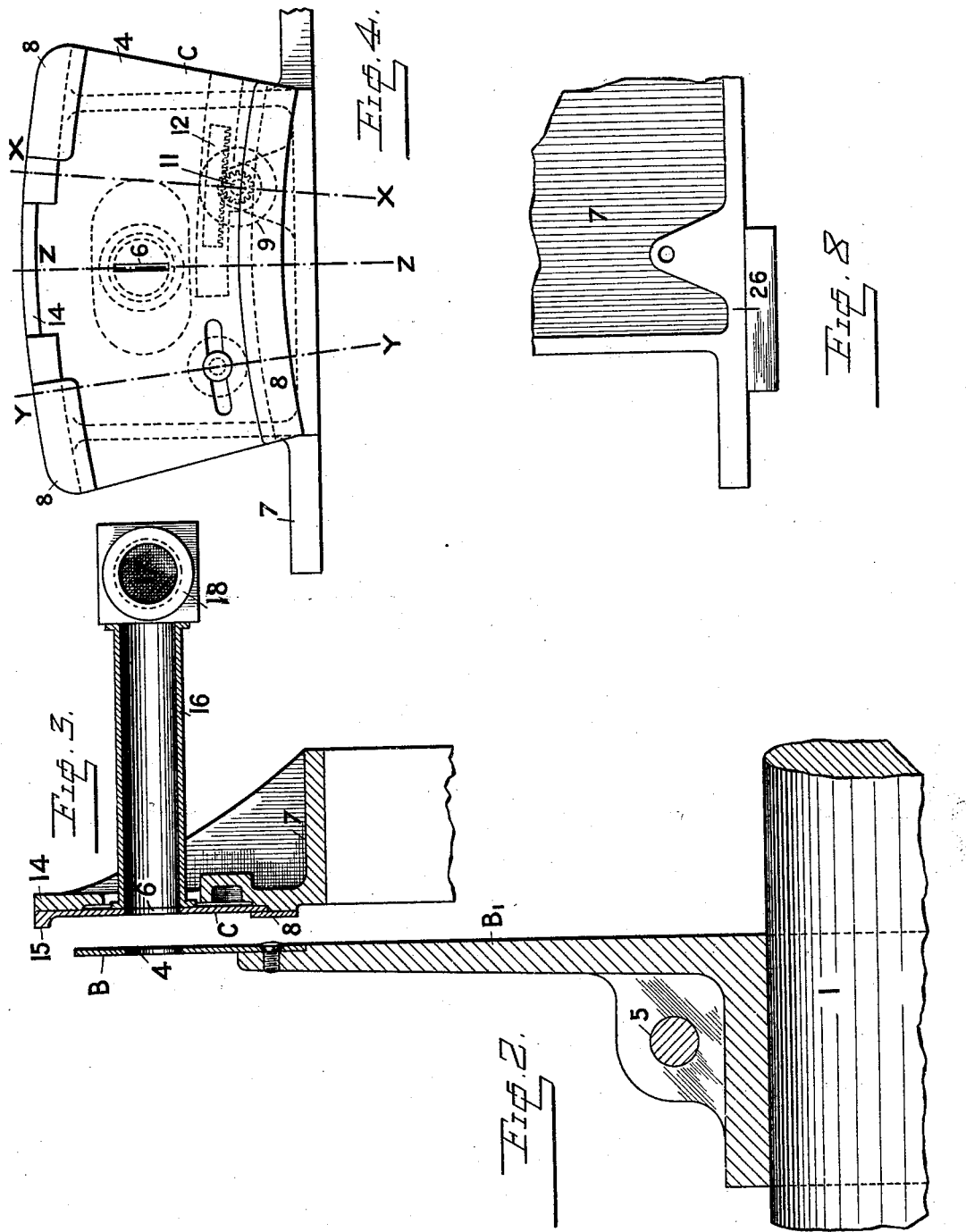

J. H. GIBSON.
APPARATUS FOR INDICATING THE MAGNITUDE OF THE TORQUE IN SHAFTING.
APPLICATION FILED FEB. 9, 1907.
902,394.
Patented Oct. 27, 1908.
4 SHEETS—SHEET 3.
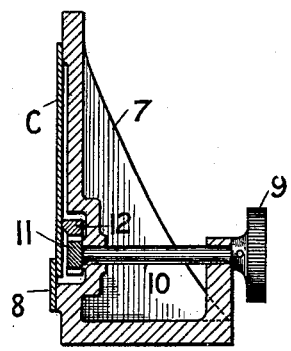
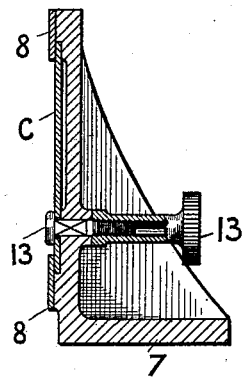
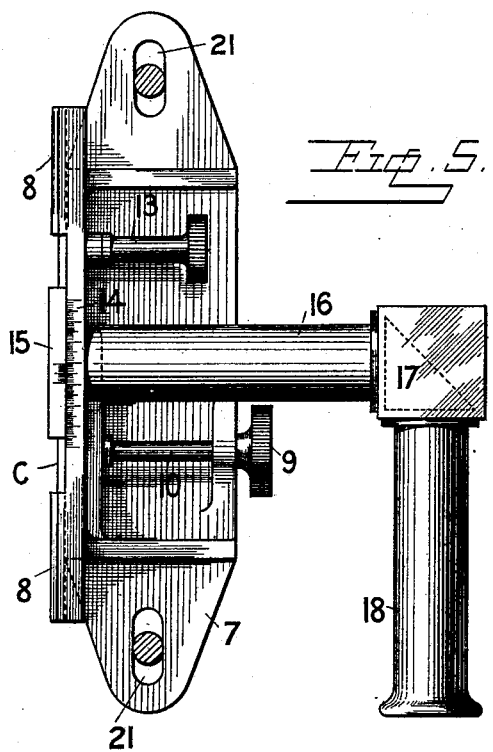

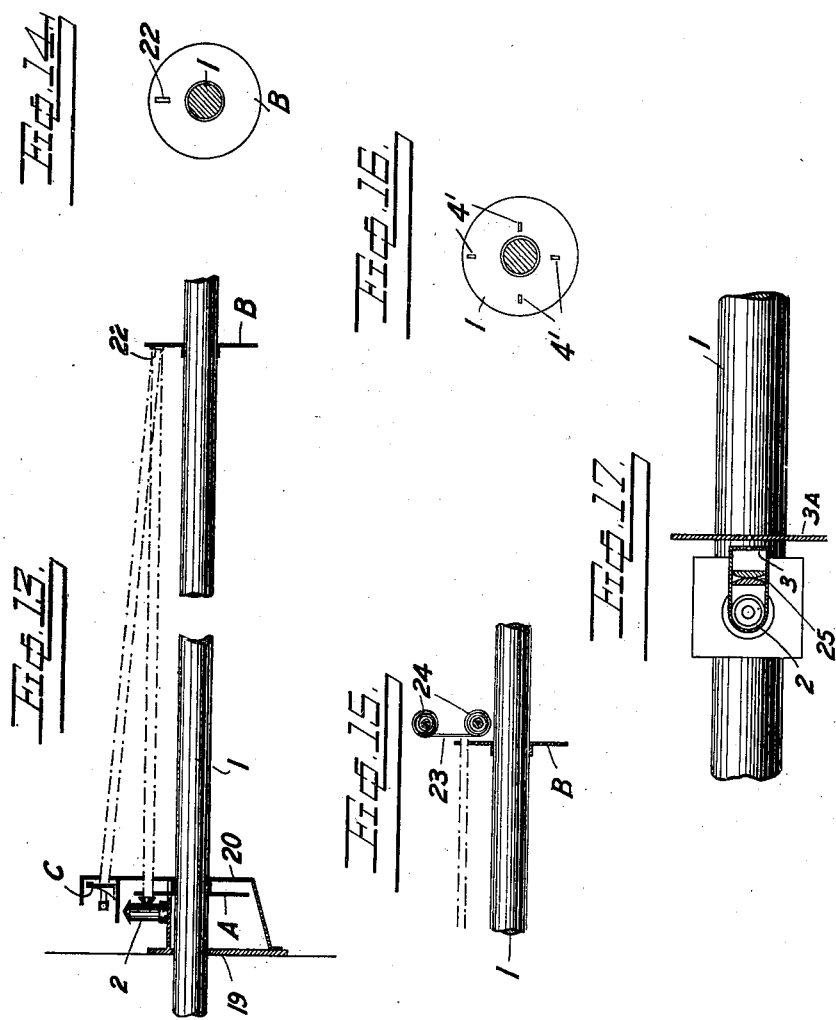

UNITED STATES PATENT OFFICE.

JOSEPH HAMILTON GIBSON, OF LISCARD, ENGLAND, ASSIGNOR OF ONE-HALF TO RESTAL RATSEY BEVIS, OF HAMPTOUNE, ENGLAND.

APPARATUS FOR INDICATING THE MAGNITUDE OF THE TORQUE IN SHAFTING.

No. 902,394.      Specification of Letters Patent.      Patented Oct. 27, 1908.

Application filed February 9, 1907. Serial No. 356,648.

*To all whom it may concern:*

Be it known that I, JOSEPH HAMILTON GIBSON, a subject of the King of Great Britain, and residing in Liscard, in the county of Chester, England, have invented certain new and useful Improvements in Apparatus for Indicating the Magnitude of the Torque in Shafting, of which the following is a specification.

This invention relates to apparatus for indicating the magnitude of the torque or turning effort in rotating shafting, and is particularly applicable to turbines in which the horse power is most readily estimated by the measurement of the torque in and the angular velocity of the transmitting shaft.

The magnitude of the torque is estimated by measuring the relative angular displacement produced thereby between two parts attached to the shaft at points as far apart as possible, and ascertaining by experiment or calculation the constant by which this angular displacement must be multiplied to give the torque.

According to this invention the angular displacement between the two parts is measured by measuring the amount by which a beam of light is deflected, when the shaft is transmitting torque, from its normal path when no torque is transmitted.

In one of the simplest arrangements, two disks are mounted on the shaft at points some distance apart, and they rotate with the shaft; a narrow radial slit is provided in each of the disks, and these slits are normally, when no torque is being transmitted, in the same plane which contains the axis of the shaft; a source of light, masked, focused, or of small dimensions, is provided behind the one disk, which for convenience will be termed the A disk, and an adjustable plate which will be termed C, also having a narrow slit, is placed in front of the other disk, which will be termed the B disk.

When the source of light and the slit in C are, say, placed in the vertical plane containing the axis of the shaft, light will pass, when no torque is being transmitted, at that instant in each revolution when the slits in A and B both coincide with this plane; when torque is being transmitted, the line A B, joining the slits in A and B, will be displaced, and in order that the beam of light may pass through C at the instant that the slit A is opposite the source of light, the slit C must be moved so as to be opposite the B slit at that instant, and this movement of the plate C from the normal position will be a measure of the displacement of B relatively to A, and will therefore be proportional to the torque. The displacement may be measured directly by moving C until the beam of light enters the eye placed in front of the C slit, an index being provided on C moving over a suitably graduated scale.

I have illustrated the preferred form of the apparatus in the accompanying drawings, in which Figure 1 shows in elevation, the general arrangement as applied to a line of screw shafting; Figs. 2 to 8 inclusive are detail views of portions of the apparatus to larger scale; Figs. 9 to 12 inclusive are diagrammatic views to explain the method of making the observations; Figs. 13 and 14 show a modification in which the B slit is replaced by a small mirror; Fig. 15 shows the arrangement of a sensitized traveling band in place of the C slit; Fig. 16 shows the modification in the slits to enable observations to be made at different points in the revolution; and Fig. 17 shows a condensing lens fitted to the lamp.

1 is the shaft, 2 is the lamp, and A, B, and C, are, respectively, the two disks and the plate already referred to under these designations.

The lamp 2 may be of any suitable kind, and it has a mask with a narrow vertical slit 3, as indicated in Fig. 17 and in Figs. 9 to 12.

The details of the disk B are shown in Fig. 2, which is a fragmentary sectional elevation; the peripheral part B is of sheet metal, with a narrow radial slit 4, secured to a stouter central part $B^1$, fitting on the shaft. The disk is in halves so that it can be clamped in any desired position on the shaft by means of bolts 5. The disk A is or may be exactly similar to the disk B. These disks are arranged as far apart as is conveniently practicable, with their slits as nearly as possible in the same plane passing through the axis of the shaft, and the slits must of course be at a sufficient distance from the shaft center to keep the path of the beam of light clear of the shafting couplings and the upper part of the plumber blocks.

The details of the plate C and the bracket which carries it, are shown in Figs. 3, 4, 5, 6, and 7, which are respectively a sectional elevation on the line Z. Z., an end view, a plan, a section on the line X. X., and a section on the line Y. Y. The plate C, which has a radial slit 6 which may be termed the sighting slit, is mounted on the bracket 7 so as to be adapted to slide for a short distance in a circular path concentric with the shaft, its edges being held by the clips 8. It is operated by the milled wheel 9, spindle 10 journaled on the bracket 7, and the spur pinion 11 which gears with the toothed arc 12 on the plate C. 13 (see Fig. 7) is a clamping screw; 14 is a scale on the bracket 7, and 15 is a vernier on the plate C.

In order that the observations may be conveniently made from the side of the shaft, a short tube 16 is fitted to the plate C, surrounding its slit 6, and a reflecting prism 17 is used to deflect the beam of light laterally along the second tube 18 which forms the eye piece.

The lamp 2 and the bracket 7 are carried from brackets 19 fixed to the ship, and 20 are hoods or screens to cut off stray light, and serve as guards for the disks. They are, of course, perforated to permit of the passage of the beam of light. The bracket 7 is held down by the slotted lugs 21 so as to permit of lateral adjustment.

The action will be best understood by considering Figs. 9 and 10 in the first instance. These are purely diagrammatic views, being horizontal sections through the slits when the latter are about their highest position, and the dimensions are quite disproportionate in order to make the action clearer. The shaft is not transmitting torque and the A slit and the B slit are supposed to be in the same plane with the axis S, S, of the shaft. The shaft rotating as indicated by the arrows, it will be seen that no light can pass through the slit B until it reaches the position shown in Fig. 9, the line D. D. indicating the dividing line between light and darkness; and on the other hand no light can pass through the B slit after it has passed the position shown in Fig. 10. Thus if the C slit be adjusted anywhere between the two positions shown in Figs. 9 and 10 respectively, a flash of light will be seen at each revolution. The length of the arc over which the flash can be so observed, obviously depends upon the width of the slits, which is exaggerated in Figs. 9 and 10, but it is obvious that if the C slit be adjusted, as shown, to the two limiting positions at which the flash disappears, the mean of the two readings will be the exact reading corresponding with slits of indefinitely small width. It will be seen that the width of the slits does not impair the accuracy of the measurement, and it is of advantage to make them of substantial width, say one-sixteenth to one-eighth of an inch.

Figs. 11 and 12 correspond to Figs. 9 and 10 and show the state of affairs when the shaft is transmitting torque. The A and B slits are now no longer in the same plane passing through the axis of the shaft, the B slit being displaced relatively to the A slit by the amount T. The C slit is moved in the direction of rotation until the flash appears, it is then advanced until the flash just disappears as in Fig. 12, and the reading taken, it is then moved backwards until the flash again disappears, as in Fig. 11, and as before, the mean of the two readings is the correct one. It is not necessary that the A and B slits should be exactly in the same plane with the axis of the shaft, as a zero reading can be taken when the shaft is rotating without transmitting turning effort, and such zero reading can be recorded as a permanent calibration to be applied to the actual readings observed. Or, by means of the slotted lugs 21, the bracket 7 can be moved laterally so as to read zero when no turning effort is transmitted, the marks 26, (see Fig. 8), for setting the bracket being determined after the apparatus is erected. In the case of a turbine steamer, the best way to take a zero reading is to turn off steam when the vessel is in motion; the propeller will then drive the shaft and the only turning effort is that necessary to overcome the friction of the bearings and the turbine, which may be neglected.

Instead of arranging for the beam of light to pass through the B disk, a mirror 22,—(see Figs. 13 and 14), may be attached to the B disk, having a reflecting area equivalent to the slit which it replaces. This mirror reflects the beam of light back towards the source, where it is received as before by the sighting slit 6 of the C plate. It will be noted that, in order that the C plate may be kept clear of the lamp, the mirror 22 is canted slightly so as not to be quite square with the shaft. The measurement is made as before by adjusting the C plate, and the arrangement has the advantage that it doubles the length of the beam of light.

Instead of observing the displacement of the beam of light by direct vision, it may be arranged to fall on a screen or on a photographically sensitized band 23,—(see Fig. 15) arranged to travel between rotatable rollers 24, and thus be self-recording.

In order to improve the illumination of the slit in the plate 3, a condensing lens 25,—see Fig. 17, may be interposed between it and the lamp; or if the source of light be narrow and sharply defined, as for instance an incandescent electric lamp with a single straight filament, the latter may be used without the slit 3.

The arrangements described, it will be seen, measure the torque at a particular instant in the revolution.

Should it be desired to measure the variations of torque during the revolution (in, say, a reciprocating engine), several sets of slits may be made at regular angular positions around the disks but at varying radial distances from the axis of rotation, as shown at 4' in Fig. 16, and each pair may be used in succession, the source of light and the plate C being moved radially, but the former being maintained in the same, say, vertical plane.

The use of a beam of light to measure the angular displacement in the manner described, dispenses with any mechanical or electrical connections between the two parts attached to the shaft, (except of course the shaft itself), and renders it possible to make such measurements quickly and with very great accuracy; moreover, by suitably arranging a graduated screen on which the deflected beam shines, as described, the instantaneous readings may be observed continuously, and if necessary recorded on photographic paper.

Having now fully described my invention, I declare that what I claim, and desire to secure by Letters Patent is:—

1. In combination a shaft, an opaque member carried thereby having an opening, a source of light on one side of said member arranged to cast a beam of light through said opening longitudinally of the shaft, and a device carried by another portion of said shaft in the normal path of said beam and adapted to indicate by its displacement in relation to said beam the amount of torsional strain on the shaft.

2. In combination a shaft, an opaque member carried thereby having an opening, a source of light on one side of said member arranged to cast a beam of light through said opening longitudinally of the shaft, and a device carried by another portion of said shaft in the normal path of said beam and adapted to indicate by its displacement in relation to said beam the amount of torsional strain on the shaft, and means for indicating the amount of displacement of said device.

3. In combination;—a shaft, a source of light, a pair of disks attached to the shaft and provided with means for transmitting a beam of light from the said source, a sighting slit to receive the said beam of light, and means for moving and measuring the movement of the said sighting slit; substantially as described.

4. In combination;—a shaft, a source of light, a pair of disks attached to the shaft, each having a slit to transmit a beam of light from the said source, and means for indicating the change of direction of the said beam of light due to angular strain of the shaft; substantially as described.

5. In combination;—a shaft, a source of light, a pair of disks attached to the shaft each having a slit to transmit a beam of light from the said source, a sighting slit to receive the said beam of light, and means for moving and measuring the movement of the said sighting slit; substantially as described.

6. In combination;—a shaft, a lamp, a screen with a slit in front of the said lamp, a pair of disks attached to the shaft, each having a slit to transmit a beam of light from the said lamp, a sighting slit to receive the said beam of light, and means for moving and measuring the movement of the said sighting slit; substantially as described.

7. In combination with the shaft, the illuminant, and the disks attached to the shaft for transmitting a beam of light from the illuminant, a plate with a sighting slit to receive the said beam of light, guided to move in a path transverse to the shaft, and provided with means for moving it and measuring its movement; substantially as described.

8. In combination with the shaft, the illuminant and the disks attached to the shaft for transmitting a beam of light from the illuminant, a plate with a sighting slit to receive the said beam of light, guided to move in a path transverse to the shaft, means for moving and measuring the extent of movement of said plate, a reflector and a sighting tube connected to said plate.

In testimony whereof I have hereunto set my hand in the presence of two subscribing witnesses.

JOSEPH HAMILTON GIBSON.

Witnesses:
JOSEPH E. HIRST,
HERBERT THOMAS.